United States Patent [19]

Hase et al.

[11] Patent Number: 4,780,671
[45] Date of Patent: Oct. 25, 1988

[54] MAGNETICALLY OPERATED NON-CONTACT MAGNETIC TORQUE SENSOR FOR SHAFTS

[75] Inventors: Hiroyuki Hase, Katano; Ichiro Yamashita, Hirakata; Shinya Tokuono, Ashiya; Masayuki Wakamiya, Suita, all of Japan

[73] Assignee: Matsushita Electric Industrial Co., Ltd., Osaka, Japan

[21] Appl. No.: 854,605

[22] Filed: Apr. 22, 1986

[30] Foreign Application Priority Data

Apr. 26, 1985 [JP] Japan .................................. 60-90039

[51] Int. Cl.$^4$ ............................................... G01B 7/24
[52] U.S. Cl. .................. 324/209; 73/DIG. 2; 73/862.36
[58] Field of Search ............... 324/209, 233, 234, 236, 324/226, 262; 73/862.33, 862.36, 862.48, 862.68, 862.69, DIG. 2

[56] References Cited

U.S. PATENT DOCUMENTS

| | | | |
|---|---|---|---|
| 3,340,729 | 9/1967 | Scoppe | 73/862.36 X |
| 3,465,581 | 9/1969 | Hohenberg | 73/862.36 |
| 3,501,950 | 3/1970 | Hohenberg | 73/862.33 X |
| 4,414,855 | 11/1983 | Iwasaki | 324/209 X |
| 4,485,682 | 12/1984 | Stroezel et al. | 73/862.36 |
| 4,502,340 | 3/1985 | Gebben | 73/862.33 |

FOREIGN PATENT DOCUMENTS 58-9034  1/1983  Japan .

*Primary Examiner*—Reinhard J. Eisenzopf
*Assistant Examiner*—Warren S. Edmonds
*Attorney, Agent, or Firm*—Stevens, Davis, Miller & Mosher

[57] ABSTRACT

A torque sensor includes a cylindrical body disposed concentrically around a shaft and having its opposite ends secured to the surface of the shaft through elastic bodies, a layer of soft magnetic alloy having a magnetostriction property and secured to the surface of the cylindrical body, and a coil disposed concentrically around the layer with an air gap between it and the layer. The torque sensor is constructed such that a strain produced on the surface of the cylindrical body by a torque is converted into a change of a relative permeability of the soft magnetic alloy due to a reverse magnetostriction effect which is detected as a change of inductance of the coil. When the shaft thermally expands or deflects, the elastic bodies act to permit only a torque to be transmitted to the cylindrical body, so that a uniform output is provided without the influence of a thermal strain and deflection of the shaft.

3 Claims, 3 Drawing Sheets

DETECTING CIRCUIT

MAGNETICALLY OPERATED NON-CONTACT MAGNETIC TORQUE SENSOR FOR SHAFTS

BACKGROUND OF THE INVENTION

The present invention relates to a torque sensor for detecting in a non-contact manner an amount of a torque transmitted to a shaft.

According to a conventional method for detecting in a non-contact manner an amount of a torque transmitted to a shaft, a strain produced on the surface of the shaft by the torque is converted into a relative permeability variation of a soft magnetic alloy having magnetostriction which is fixed to the surface of the shaft, and this variation is detected as an inductance variation through a coil disposed at the periphery of the shaft. However, the torque sensor of this type has disadvantages that the output of the sensor is changed by the difference between amounts of thermal expansion of the shaft and the soft magnetic alloy. The magnitude of this change depends on the difference of the coefficient of linear thermal expansion between the shaft, and soft magnetic alloy.

Accordingly, it is necessary to modify the factors of temperature compensation etc., in accordance with the change of the coefficient of linear thermal expansion which is caused when the kind of the material forming the shaft is changed. Moreover, sensitivity is considerably lowered when a thermal strain equal to or more than $400 \times 10^{-6}$ due to the difference in amounts of the thermal expansion between the shaft and the soft magnetic alloy is applied to a soft magnetic layer.

SUMMARY OF THE INVENTION

The object of the present invention is to provide a torque sensor which does not need any modification of temperature compensation even when a material for a shaft must be changed and whose sensitivity is not lowered under the influence of the temperature change.

To this end, the present invention provides a torque sensor comprising: a cylindrical body concentrically disposed around a shaft with an air gap therebetween, said shaft serving to transmit torque, the opposite ends of said cylindrical body being secured to said shaft through elestic bodies; a layer of a soft magnetic alloy having magnetostriction and secured to the outer peripheral surface of said cylindrical body; a coil concentrically wound round said layer of a soft magnetic alloy with a predetermined air gap therebetween; and a magnetic circuit incorporating thereinto said layer of a soft magnetic alloy and said coil whereby a strain produced on said shaft by torque is detected in the form of a change in inductance of said magnetic circuit.

DESCRIPTION OF THE PREFERRED EMBODIMENTS

Figure 1:
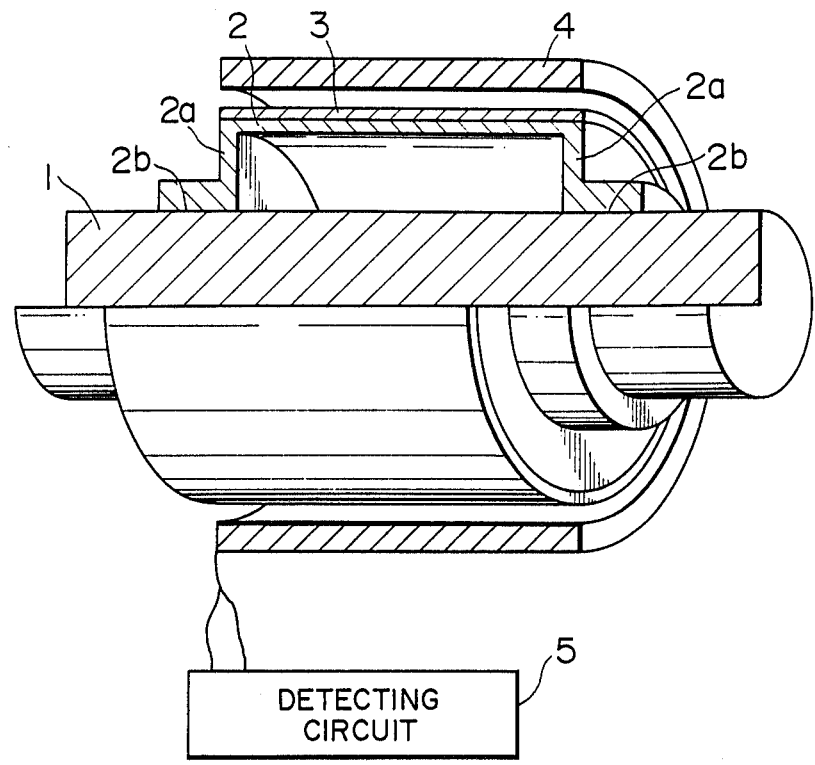
FIG. 1 is a fragmentary, perspective view of a torque sensor according to an embodiment of the present invention.

FIG. 1 shows a torque sensor according to an embodiment of the present invention. A torque transmitting shaft 1 is made of a steel which is generally used. The coefficient of linear thermal expansion and Young modulus of the steel are $12 \times 10^{-6}$ (1/°C.) and 21,000 kg/mm² respectively. A cylindrical body 2 made of a 45% Ni-Fe alloy (coefficient of linear thermal expansion: $8 \times 10^{-6}$ (1/°C.)) is connected to fixing portions 2b through the medium of resilient portions made of 45% Ni-Fe alloy 2a, and the fixing portions 2b are fixedly attached to the shaft 1 by brazing. A layer 3 of Fe-Cr-Si-B system amorphous alloy (FeCr)$_{80}$Si$_{13}$B$_7$ (atms. %)) having saturation magnetostriction $\lambda_s = 20 \times 10^{-6}$ is attached to the peripheral surface of the cylindrical body 2. The coefficient of linear thermal expansion of this amorphous alloy 3 is $8 \times 10^{-6}$ (1/°C.). A coil 4 is wound around the amorphous alloy 3 in spaced relationship therewith. The coil 4 is connected to a detecting circuit 5 to obtains the inductance value. When a torque is transmitted to the shaft 1, a strain caused by torsion thereof is produced on the amorphous alloy 3 to reduce the magnetic permeability thereof. Simultaneously, the inductance of the coil is reduced. Thus the value of the torque can be obtained from the inductance of the coil.

Figure 2:
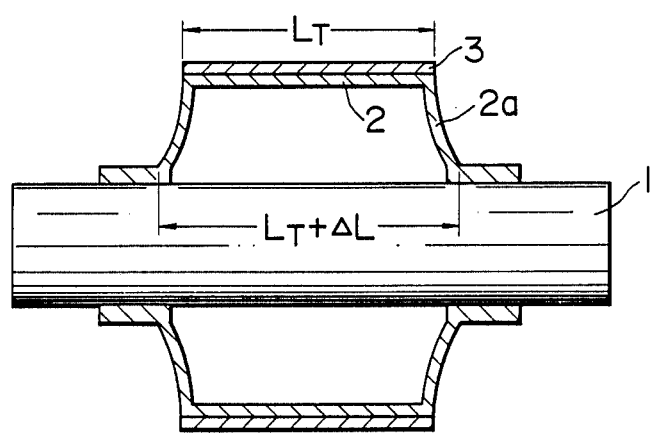
FIG. 2 is a sectional view showing in function of a resilient portion in the embodiment shown in FIG. 1.

FIG. 2 shows the state of the torque sensor according to the present invention under the condition of a temperature T, in which the thermal expansion of the shaft 1 is shown to be larger by ΔL as compared with the amorphous alloy 3 of which length is represented by $L_T$ at this temperature level. The thermal expansion of the shaft 1 is absorbed in a deflection of the resilient portion 2a to have no influence on amorphous alloy 3. Accordingly, the thermal expansion strain of the shaft 1 is not transmitted to the amorphous 3 to any substantial extent even when the shaft 1 is formed of a material having a different coefficient of linear thermal expansion. Thus, for this reason, variation of the temperature characteristic is greatly reduced, whatever material forms the shaft 1.

Figure 3:
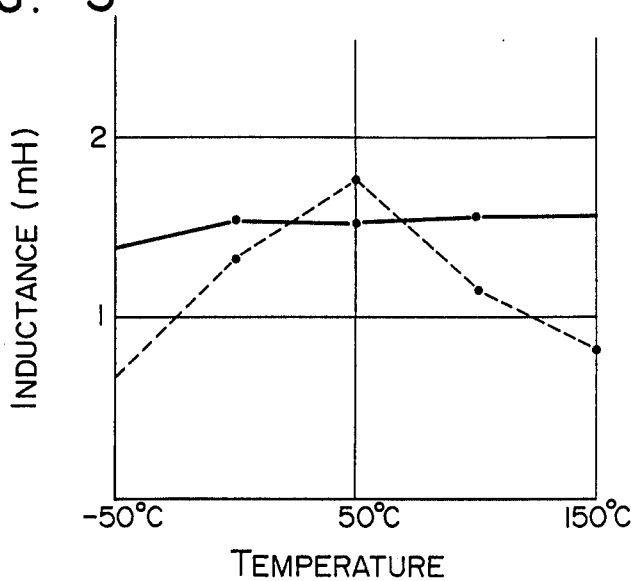
FIG. 3 is a graph showing inductance variations with temperature change.

The effect of the above arrangement will be described below. A solid line in FIG. 3 shows the inductance of the coil 4 meausred at a constant torque over a temperature range of from −50° C. to 150° C. As described above, the coefficient of linear thermal expansion of the steel is $12 \times 10^{-6}$ (1/°C.) while that of the amorphous alloy 3 is $8 \times 10^{-6}$ (1/°C.). The variation of the inductance with temperature is extermely small, although there is a difference in the coefficient of linear thermal expansion between the shaft 1 and the amorphous alloy 3. This is because the thermal expansion of the shaft 1 can be absorbed by the use of the cylindrical body 2 and the resilient portion 2a. For the purpose of comparison, a broken line in FIG. 3 also shows the inductance variation of the coil 4 which is measured at a constant torque over a temperature range of from −50° C. to 150° C. in a conventional torque sensor in which the amorphous alloy 3 is directly fixed to the steel shaft. It is thus seen that a difference in thermal expansion between the shaft 1 and the layer 3 results in a large inductance variation with temperature.

Figure 4:
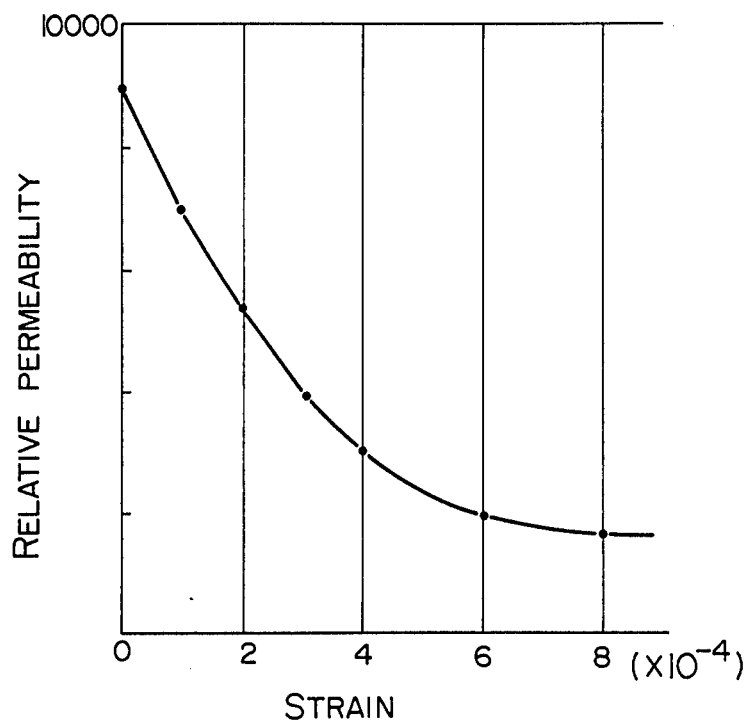
FIG. 4 is a graph showing a reverse magnetorestriction effect.

When the amorphous alloy 3 having magnetostriction is stretched by an elongation of more than about $4 \times 10^{-4}$ upon the application of tensile strain, the relative permeability changes at an extremely small rate in relation to the strain. This relationship is shown in FIG. 4. That is, the relative permeability variation with torque becomes extremely small when a strain of more than $4 \times 10^{-4}$ applies. It is thus required that the thermal strain produced in the amorphous alloy 3 by a thermal expansion difference be below $4 \times 10^{-4}$ at most. When the torque sensor is used in an automobile, it is subjected to temperature variations having a range of about 200° C. It is possible to realize a torque sensor having a favorable seniitivity in a temperature variation range of 200° C. if the respective coefficients of thermal expansion, the cylindrical body 2 and the amorphous alloy 3 are set to be equal to or less than $2 \times 10^{-6}$.

Figure 5:
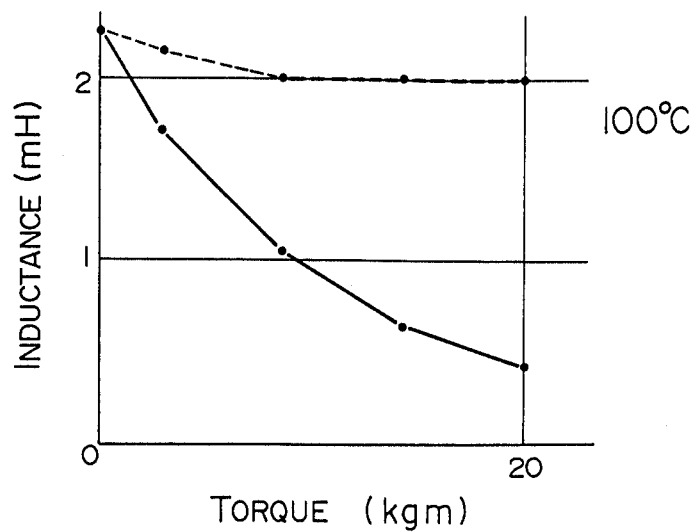
FIG. 5 is a graph showing an output of the torque sensor at 100° C.

FIG. 5 shows the result obtained when a difference in a linear thermal expansion coefficient between the cylindrical body 2 and the amorphous alloy 3 is set to be equal to or less than $2 \times 10^{-6}$ (1/°C.). The drawing shows outputs of a torque sensor at 100° C. with respect to the two cylindrical bodies 2, one of which is formed of a 45% Ni-Fe alloy (coefficient of linear thermal expansion $8 \times 10^{-6}$ (1/°C.)) and secures thereto a Fe-based amorphous alloy layer (coefficient of linear thermal expansion: $8 \times 10^{-6}$ (1/°C.), and the other of which is formed of a soft steel (coefficient of linear thermal expansion: $11 \times 10^{-6}$ (1/°C.)) and secures thereto an amorphous alloy (coefficient of linear thermal expansion: $8 \times 10^{-6}$ (1/°C.)).

In this case, the shaft diameter was $\phi$ 30 and the torque applied was 0 (Kg.m) to 20 (Kg.m). The detecting circuit 5 made conditions in which frequency was 50 kHz and the magnetic field produced was 20e. A solid line in the drawing indicates the characteristic of a torque sensor using the 45% Ni-Fe cylindrical body 2 in which the difference in coefficients of linear thermal expansion between the cylindrical body 2 and the amorphous alloy 3 is not more than $2 \times 10^{-6}$ (1/°C.). The broken line indicates the characteristic of a torque sensor using the soft steel cylindrical body 2 in which the difference in coefficients of linear thermal expansion between the cylindrical body 2 and the amorphous alloy 3 is $3 \times 10^{-6}$ (1/°C.). Similar results are obtained over the temperature range of from $-50°$ C. to 150° C. Thus, a stable output over the temperature range of from $-50°$ C. to 150° C. can be obtained by setting the difference in coefficients of linear thermal expansion to be equal to or less than $2 \times 10^{-6}$ (1/°C.). In addition, it has been proved that the results equivalent to those shown in FIG. 5 can be obtained in case the cylindrical body 2 is formed of 43% Ni-Fe alloy (coefficient of linear thermal expansion: $6 \times 10^{-6}$ (1/°C.)), 49% Ni-Fe alloy (coefficient of linear thermal expansion: $10 \times 10^{-6}$ (1/°C.) or titanium alloy (coefficient of linear thermal expansion ($9 \times 10^{-6}$ (1/°C.)), and that any material would suffice if the difference in coefficients of linear thermal expansion between the cylindrical body 2 and the amorphous alloy 3 were below $2 \times 10^{-6}$ (1/°C.), as described above. In particular, Ni-Fe alloys can be varied in their coefficients of linear thermal expansion in the range of 1 to $14 \times 10^{-6}$ by slightly changing the concentration of Ni, and are readily compatible with the amorphous alloy 3 in terms of coefficients of linear thermal expansion. Accordingly, Ni-Fe alloys are most suitable for materials of the cylindrical body in the present torque sensor.

Also, it has been proved that when the amorphous alloy 3 is formed of Fe, Ni and other metals having magnetostriction, or amorphous alloys such as Fe-Co-Si-B and Fe-Ni-Si-B having magnetostriction, the results equivalent to those shown in FIG. 5 can be obtained if the difference in coefficients of linear thermal expansion between the cylindrical body 2 and the amorphous alloy 3 is below $2 \times 10^{-6}$ (1/°C.). In particular, amorphous alloys have large magnetostriction and permeability, and are superior in their frequency characteristics to metallic materials. Accordingly, amorphous alloys are most suitable in improving the sensitivity and response characteristics of the present torque sensor.

With the above-described arrangement, the output of the torque sensor can be stabilized over a temperature range of from $-50°$ C. to 150° C. independently of materials which forms the shaft.

Figure 6:
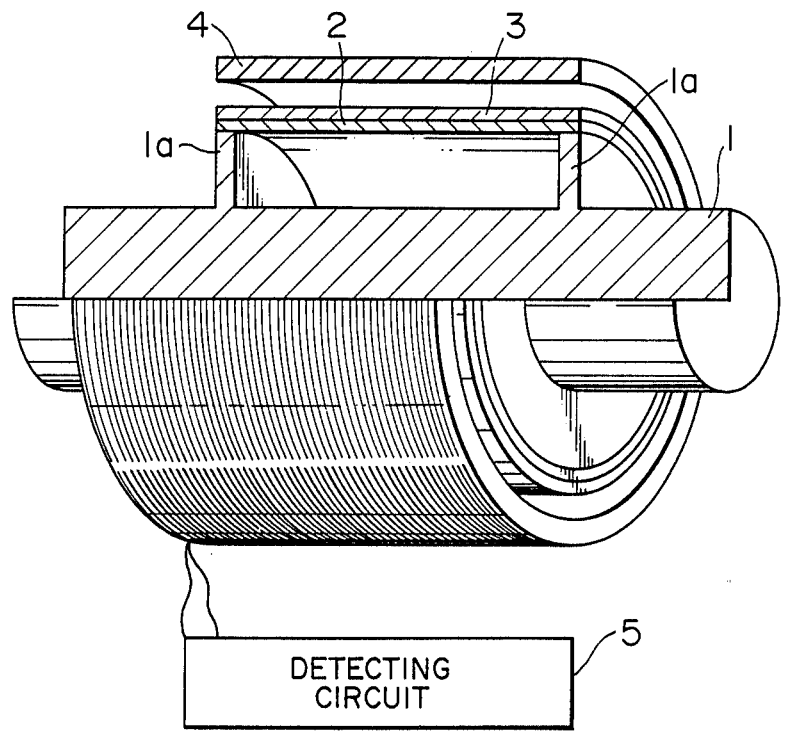
FIG. 6 is a fragmentary, perspective view of another embodiment of the present invention.

FIG. 6 shows another embodiment of the present invention. In this embodiment, the shaft 1 made of stainless steel has two circular resilient portions 1a which are formed by working the shaft. A hollow cylindrical body 2' (coefficient of linear thermal expansion: $8 \times 10^{-6}$ (1/°C.)) made of 45% nickel steel is welded to the outer circumference of the resilient portions 1a. The amorphous alloy 3 is made of $Fe_{80}Cr_3Ni_3Si_8B_6$ (coefficient of linear thermal expansion: $9 \times 10^{-6}$ (1/°C.)). Other constituents are the same as those indicated in FIG. 1.

It has been proved that the torque sensor according to this arrangement can attain the same effect as the first embodiment.

The advantages of this arrangement will be described hereunder. When the cylindrical body 2 is welded to the shaft, some eccentricity of the shaft may result due to possible thermal stress in the arrangement of the first embodiment, since the cylindrical body 2 is directly welded to the surface of the shaft. According to the arrangement of this embodiment, it is possible to prevent any eccentricity of the shaft 1 because the cylindrical body 2 is welded to the outer circumference of the circular resilient portions 1a.

These two embodiments of the present invention also ensure that, when deflection of the shaft is caused by a bending moment applied thereto, an amount of deflection transmitted to the amorphous alloy 3 is reduced to not more than one tenth of the deflection of the shaft itself. Rotation of the shaft generally causes some eccentricity thereof, and the deflection strain thereof is transmitted to the amorphous alloy 3, thus causing an output error. With the arrangements of the embodiments, such an output error caused by deflection can be reduced.

Moreover, the amorphous alloy 3 may be formed on the cylindrical body 2 instead of being formed directly on the shaft 1, thus improving the work efficiency.

What is claimed is:

1. A torque sensor comprising:
a cylindrical body concentrically disposed around a shaft with an air gap therebetween, said cylindrical body having a first coefficient of linear expansion, said shaft serving to transmit torque, the opposite ends of said cylindrical body being secured to said shaft through elastic bodies;
a layer of a soft magnetic alloy having a magnetostriction property which is secured to the outer peripheral surface of said cylindrical body, said layer further having a second coefficient of linear expansion, the difference between said first coefficient of linear expansion and said second coefficient of linear expansion is below $\pm 2 \times 10^{-6}$ (1/°C.);

a coil concentrically wound around said layer of a soft magnetic alloy with a predetermined air gap therebetween, said soft magnetic alloy and said coil constituting a magnetic circuit such that a strain produced on the surface of said cylindrical body by a torque is converted into a change of a relative permeability of said soft magnetic alloy due to a reverse magnetostriction effect; and means for measuring a change of induction in said coil, said change of induction in said coil resulting from the change of permeability of said soft magnetic alloy, to provide a detection of torque on said shaft.

2. A torque sensor as set forth in claim 1, wherein said cylindrical body is made of a Fe-Ni alloy.

3. A torque sensor as set forth in claim 2, wherein said soft magnetic alloy layer is made of an amorphous alloy.

* * * * *